United States Patent [19]

Van Broekhoven et al.

[11] Patent Number: 4,880,909

[45] Date of Patent: Nov. 14, 1989

[54] REMOVAL OF CATALYST RESIDUES FROM CARBON MONOXIDE/OLEFIN POLYMERS WITH OXIDANT/PHOSPHINE TREATMENT

[75] Inventors: Johannes A. M. Van Broekhoven; Michael J. Doyle, both of Amsterdam, Netherlands

[73] Assignee: Shell Oil Company, Houston, Tex.

[21] Appl. No.: 240,338

[22] Filed: Sep. 6, 1988

Related U.S. Application Data

[62] Division of Ser. No. 935,429, Nov. 26, 1986, Pat. No. 4,786,716.

[30] Foreign Application Priority Data

Nov. 26, 1985 [NL] Netherlands ..................... 8503258

[51] Int. Cl.$^4$ ............................................. C08G 67/02
[52] U.S. Cl. .................................... 528/487; 526/69; 528/392; 528/494; 528/495; 528/496
[58] Field of Search ............... 528/392, 487, 494, 495, 528/496; 526/69

[56] References Cited

U.S. PATENT DOCUMENTS

| | | | |
|---|---|---|---|
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,984,388 | 10/1976 | Shryne | 260/63 |
| 4,076,911 | 2/1978 | Fenton | 526/11.1 |
| 4,786,716 | 11/1988 | Van Broekhoven et al. | 528/487 |

FOREIGN PATENT DOCUMENTS

| | | |
|---|---|---|
| 121965 | 8/1984 | European Pat. Off. |
| 2046968 | 9/1964 | Japan |
| 1081304 | 8/1967 | United Kingdom |

OTHER PUBLICATIONS

Kirk–Othmer Encyclopedia of Chemical Technology, 2nd Edition, vol. 12, p. 132, 1967.
Organometallics 1984, 3, 866–870.
Proc. Ind. Assoc. Cult. Sci. 1985, 68B, 1–5.
Chemtech 1986, 1, 48–51.
Adv. Polym. Sci. 1986, 73–4, 125–44.
Polym. Lett. 1965, 3, 703–7.
Chim. Ind. 1971, 53, 939–40.
J. Mol. Catal. 1983, 18, 117–25.
J. Organomet. Chem. 1985, 279, C5–10.

*Primary Examiner*—Harold D. Anderson
*Attorney, Agent, or Firm*—Dean F. Vance

[57] ABSTRACT

The invention is a process for reducing catalyst residues from a Group VIII metal compound-containing polymer of CO, ethylene and optionally at least one olefinically unsaturated hydrocarbon. The process comprises contacting the polymer with an effective amount of a bidentate phsophine ligand having the general formula

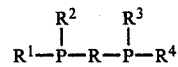

wherein $R^1$, $R^2$, $R^3$ and $R^4$ represent hydrocarbon groups which may contain polar or non-polar substituents and R represents a bivalent organic bridging group containing at least two carbon atoms in the bridge, recovering a Group VIII metal compound-containing organic liquid, contacting said Group VIII metal compound-containing liquid with an effective oxidant for the Group VII metal and recycling the resulting oxidized Group VIII metal compound to a process for preparing polymers of carbon monoxide and ethylene.

12 Claims, No Drawings

REMOVAL OF CATALYST RESIDUES FROM CARBON MONOXIDE/OLEFIN POLYMERS WITH OXIDANT/PHOSPHINE TREATMENT

This is a division of application Ser. No. 935,429, filed Nov. 26, 1986, now U.S. Pat. No. 4,786,716.

FIELD OF THE INVENTION

The invention relates to a process for the removing palladium catalyst residues incorporated in polymers during their preparation.

BACKGROUND OF THE INVENTION

Polymers of carbon monoxide and olefins, such as ethylene, have been known and available in limited quantities for many years. For example, polyketones are disclosed in *Kirk-Othmer Encyclopedia of Chemical Technology*, Second Edition, Vol. 12, p. 132, 1967, and in *Encyclopedia of Polymer Science and Technology*, 1968, Vol. 9, 397–402. The low molecular weight copolymers in particular may be used as intermediates for the production of plastics, as components in blends with other polymers (such as waxes and greases) and as pour-point depressants for middle distillate petroleum fuel products. The higher molecular weight polymers have use and utility as premium-thermoplastics for fibers, films, injection molding, compression molding or blowing applications.

High molecular weight linear polymers of carbon monoxide and ethylene in which monomer units occur in alternating order and which polymers consist of units of the formula

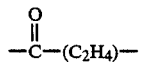

can be prepared by using Group VIII metal organic phosphine compounds as a catalyst, such as palladium organic phosphine compounds. For example U.K. Patent No. 1,081,304, U.S. Pat. Nos. 3,689,460, and 3,694,412 disclose processes using palladium catalysts having monodentate alkyl phosphine ligands. Similar palladium catalysts having monodentate phosphine ligands are disclosed in the articles found in *J. Am. Chem. So.* 1982, 104, 3520-2, *Organometallics* 1984, 3, 866–70, *Proc. Ind. Assoc. Cult. Sci.* 1985, 68B, 1–5 and *CHEMTECH* 1986, 1, 48–51. European Patent Application No. 121,965 discloses a process for polymerizing CO and an alkenically unsaturated hydrocarbon using a Group VIII metal complex having bidentate phosphorous, arsenic or antimony ligands. Application of these catalysts to a monomer mixture which, in addition to carbon monoxide and ethylene, comprises at least one olefinically unsaturated hydrocarbon having the general formula $C_xH_y$, which hydrocarbon has fewer than 20 carbon atoms and contains an olefinically unsaturated —CH=CH— group, leads to the formation of polymers with units of the formula

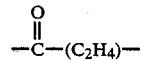

and units of the general formula

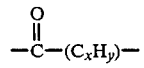

occurring randomly distributed within the polymer. The structure of the copolymers and "terpolymers" differs only in that in the case of the "terpolymers" a unit of

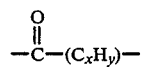

is encountered at some random places in the polymer instead of a unit of

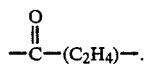

The polymers have excellent mechanical properties; especially, very high strength stiffness and impact resistance. However, the use of the Group VIII metal organic phosphine compounds as catalysts has the drawback that a considerable part of the metal catalyst remains in the polymers and cannot be removed therefrom by washing. The presence of a metal compound in the polymers is undesirable for two reasons. First, it poses problems to the processing of the generally high-melting polymers. This processing—for instance by injection molding—is done in the molten state with the polymer at a temperature at least 25° C. above its melting point. The presence of a metal compound in the polymers makes them incapable of withstanding the high temperatures required in the processing. Serious discoloring and decomposition of the polymers is the result. Decomposition can further cause severe gelling which is a considerable hindrance to the processing of the polymers. As a rule the processing problems become worse as the content of metal compound in the polymers increases.

Second, it is undesirable that metal catalyst residue should be present in the polymers in that the catalyst is continually removed from the process of preparation and has to be supplemented to maintain the reaction. This reason concerns the cost of the catalyst. Although the concentration of catalyst in the process is small, when virtually all the metal employed ends up in the prepared polymer, it becomes a considerable expense to continually replace the catalyst especially for expensive Group VIII metals such as palladium. This may form a serious impediment to the polymer preparation being applied on a technical scale.

SUMMARY OF THE INVENTION

Recently, it has been shown that a Group VIII metal compound can be removed at least partly from a polymer by contacting the polymer with an effective organic phosphine chosen from a certain class. The present invention therefore relates to a process for reducing catalyst residues from a Group VIII metal compound-containing polymer of CO, ethylene and optionally at least one olefinically unsaturated hydrocarbon. The process comprises contacting the polymers containing a Group VIII metal compound with an effective amount of a bidentate phosphine ligand having the general formula

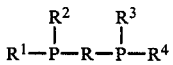

wherein $R^1$, $R^2$, $R^3$ and $R^4$ represent hydrocarbon groups which may contain polar or non-polar substituents and R represents a bivalent organic bridging group containing at least two carbon atoms in the bridge. The invention also relates to a process for reducing catalyst residues from a palladium compound-containing polymer of CO, ethylene and optionally at least one olefinically unsaturated hydrocarbon and regenerating a palladium catalyst for the preparation of such polymers by contacting the palladium compound with an oxidant. The application further relates to the polymers from which at least part of the palladium has been thus removed as well as to articles of manufacture which consist at least partly of the polymers thus purified.

DESCRIPTION OF THE INVENTION

For the sake of brevity the phosphines suitable in the process of the invention will be referred to as "BDL" (bidentate ligand) phosphines.

In the process according to the invention the BDL phosphine is preferably contacted with a suspension of the polymer in an organic liquid. Very suitable organic liquids are lower alcohols, such as methanol and ethanol. The treatment of a polymer suspension with the BDL phosphine is preferably carried out at a temperature of 50°–140° C. and most preferably at a temperature of 80°–110° C.

In the process according to the invention the polymer is contacted with an effective amount of a BDL phosphine. An effective amount of a BDL phosphine is the amount of phosphine necessary to reduce catalyst residues and improve processability of a Group VIII metal compound-containing polymer of CO, ethylene and optionally at least one olefinically unsaturated hydrocarbon. It is preferred to us at least 0.25 mol BDL phosphine per gram atom of Group VIII metal present in the polymer as Group VIII metal compound. More preferably, the quantity of BDL phosphine employed is 0.5–10, and most preferably, 1–3 mol BDL phosphine per gram atom of Group VIII metal present in the polymer as Group VIII metal compound. For example, it is preferred to use at least 0.25 mol BDL phosphine per gram atom of palladium present in the polymer. More preferably, the quantity of BDL phosphine employed is 0.5–10, and most preferably, 1–3 mol BDL phosphine per gram atom of palladium present in the polymer.

The groups $R^1$, $R^2$, $R^3$ and $R^4$ present in the BDL phosphine of the general formula

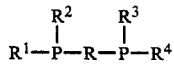

preferably contain 6 to 14 carbon atoms. Particularly preferred are BDL phosphines in which the groups $R^1$, $R^2$, $R^3$ and $R^4$ are phenyl groups, alkyl-substituted phenyl groups, and phenyl groups containing polar group substituents, such as alkoxy groups. The bivalent organic bridging group R preferably contains three carbon atoms in the bridge. Examples of suitable BDL phosphines are the bisphosphine 1,3-bis(di-p-tolylphosphino)propane and 1,3-bis(diphenylphosphino)propane and the trisphosphine 2-methyl-2-(methyl diphenylphosphine)-1,3- bis(diphenylphosphino)propane. Preference is given to the use of either one of the latter two BDL phosphines.

In the process according to the invention the polymer product obtained is a polymer having a reduced Group VIII metal compound content and therefore improved thermal stability. In addition, a Group VIII metal compound-containing solution is obtained from which the Group VIII metal compound that is formed in the process according to the invention can be separated. The separation of the Group VIII metal compound from the solution can very suitable be carried out by contacting the solution with a strongly acidic ion exchanger. By decomposition of the Group VIII metal compound the Group VIII metal can be recovered and subsequently be used again to prepare the Group VIII metal phosphine composition which is used as the catalyst for preparation of the polymer.

Instead of the above-described, rather cumbersome route to prepare fresh catalyst by separation, decomposition and synthesis from the recovered Group VIII metal compound of the present process, an a alternate scheme presents a simpler way of attaining the same objective. The alternate scheme is preferred where the Group VIII metal is palladium. After contacting the polymer to remove catalyst residues and separating the polymer from the Group VIII metal compound-containing solution, the Group VIII metal compound present in the solution can be directly converted into active catalyst by contacting the solution with an oxidant. The preferred quantity of oxidant used therein depends on the quantity and the type of BDL phosphine employed in the process according to the invention. If use is made of a bisphosphine, such as 1,3-bis(diphenylphosphino)propane, the quantity of oxidant preferably amounts to 0 0.5–1.5 gram equivalents and in particular 0.75–1.25 gram equivalents per mol of BDL phosphine used. If a trisphosphine such as 2-methyl-2-(methyl diphenylphosphino)-1,3-bis(diphenylphosphino)-propane is employed, the quantity of oxidant preferably amounts to 1–3 gram equivalents and in particular 1.5–2.5 gram equivalents per mol of BDL phosphine used. The term 'gram equivalent of oxidant' is used in this connection to designate a quantity of oxidant which corresponds with 1 gram atom of oxygen. Effective oxidants are, among others, peroxides, hydroperoxides and oxygen. After treatment with an oxidant, the solution can at once be used for the preparation of an additional amount of polymer.

If the removal of the Group VIII metal content from the polymer obtained in the process according to the invention is considered insufficient, the process can be repeated once or several times. To this end the polymer, after having been separated from the Group VIII metal compound-containing solution previously, is again allowed to suspend in fresh organic liquid, upon which the suspension is again contacted with a BDL phosphine.

The process according to the invention relates to polymers preferably prepared by using an Group VIII metal organic phosphine compound as the catalyst. Examples of such catalyst are alkylphosphine and arylphosphine complexes of palladium, such as bis(tributylphosphine)PdCl$_2$ , bis(triphenylphosphine)PdCl$_2$, π-alkyl(triphenylphosphine)PdCl and tetrakis (triphenylphosphine)Pd.

For the preparation of the present polymers there is a strong preference for the use of a certain class of catalysts. These catalysts, which possess a much higher activity than those mentioned above, comprise a compound of a Group VIII metal selected from the group consisting of palladium, cobalt and nickel, an anion of an non-hydrohalogenic acid with a pKa of less than 6, and a BDL phosphine. For the sake of brevity these catalysts will hereinafter be referred to as 'BDL' (bidentate ligand) catalysts. In the preparation of the polymers it is preferred to use a BDL catalyst comprising a palladium salt of a carboxylic acid, in particular palladium acetate. Examples of suitable acids with a pKa of less than 6 (determined in aqueous solution at 18° C.) are sulfonic acids, such as methanesulfonic acid, trifluoromethanesulfonic acid and para-toluenesulfonic acid, and carbodylic acids, such as trichloroacetic acid, difluoro acetic acid and trifluoroacetic acid. p-Toluenesulfonic acid and trifluorocetic acid are preferred. In the BDL catalyst the anion of the acid with a pKa of less than 6 preferably occurs in a quantity of from 0.5 to 200, and in particular of from 1.0 to 100, equivalents per gram atom of Group VIII metal. In the BDL catalysts the BDL phosphine preferably occurs in a quantity of 0.1–2, and in particular of 0.9–1.1, mol per mol of Group VIII metal compound. As for the type of BDL phosphine used in the BDL catalysts, the same preferences apply as stated before for the BDL phosphine used in the process according to the invention. The quantity of BDL catalyst used in the preparation of the polymers may vary within wide ranges. A quantity of BDL catalyst is employed per mol of olefinically unsaturated hydrocarbon to be polymerized which preferably comprises $10^{-7}$–$10^{-3}$, and in particular $10^{-6}$–$10^{-4}$, grqm atom of palladium. The preparation of the polymers using a BDL catalyst is preferably carried out at a temperature of 20°–150° C. and a pressure of 1–200 bar and in particular at a temperature of 30°–100° C. and a pressure of 20–100 bar.

The process according to the invention relates to the removal of catalyst residues from polymers of carbon monoxide with ethylene and optionally at least one olefinically unsaturated hydrocarbons. The latter olefinically unsaturated hydrocarbons preferably have the general formula $CHR_1=CHR_2$, wherein the groups $R_1$ and $R_2$ together contain fewer than 18 carbon atoms and $R_1$ is an hydrocarbon group, and $R_2$ is hydrogen or an hydrocarbon group. In the latter case $R_1$ and $R_2$ may together from part of a cyclic structure, as in the monomers cyclopentene and cyclohexene. Preference for the hydrocarbons groups $R_1$ and $R_2$ is given to alkyl groups. Especially preferred are monomers in which $R_2$ is hydrogen, while $R_1$ is an alkyl group and more specifically a methyl group. In the mixture to be polymerized the molar ratio of the olefinically unsaturated hydrocarbons relative to carbon monoxide preferably is 10:1–1:5 and in particular 5:1–1:2.

The polymers to which the process according to the invention relates are normally prepared by contacting the monomers at elevated temperature and pressure with a solution of the catalyst in an organic liquid. Very suitable organic liquids are lower alcohols, such as methanol and ethanol. During the polymerization the polymer is obtained in the form of a suspension in the organic liquid. After the desired level of polymerization is reached, the polymerization is usually terminated by cooling and releasing the pressure. The polymer can be isolated from the suspension by filtration, washing and drying. The process according to the invention can be carried out by re-suspension of a polymer thus prepared and by contacting this suspension with the BDL phosphine. However, the BDL phosphine should preferably be added to the polymer suspension during the polymerization, at the moment of achieving the desired level of polymerization, at the moment of achieving the desired level of polymerization, since investigation has shown that the polymerization is terminated by this addition.

The invention will now illustrated with the aid of the following examples.

EXAMPLE 1

A carbon monoxide/ethylene copolymer was prepared as follows. 200 ml Methanol was introduced into a mechanically stirred autoclave of 300 ml capacity. The air present in the autoclave was expelled by pressurizing the autoclave with carbon monoxide until a pressure of 50 bar was reached, then releasing the pressure and repeating this treatment twice. After the contents of the autoclave had been brought to 85° C., a 1:1 carbon monoxide/ethylene mixture was introduced under pressure until a pressure of 55 bar was reached. Subsequently a catalyst solution was introduce into the autoclave, consisting of:

12 ml methanol,
0.02 mmol palladium acetate,
0.02 mmol 2-methyl-2(methyldiphenylphosphino)-1,3-bis(diphenylPhosphine)Propane and
0.04 mmol para-toluenesulfonic acid.

The pressure was maintained at 55 bar by introducing under pressure a 1:1 carbon monoxide/ethylene mixture. After 2 hours the polymerization was stopped by cooling the reaction mixture down to room temperature and releasing the pressure. The copolymer was filtered off, washed with 200 ml methanol and dried at 70° C. 21 g Copolymer with a palladium content of 95 ppmw was obtained, which means that 94% of the palladium present in the catalyst had remained behind in the copolymer.

EXAMPLE 2

A carbon monoxide/ethylene copolymer was prepared in substantially the same way as in Example 1, except that the polymerization was terminated after 2 hours by pumping into the autoclave a solution of 0.04 mmol 2-methyl-2-(methyldiphenylphosphino)-1, 3-bis(-diphenylphosphino) propane in 10 ml of methanol. After the temperature had been brought down to room temperature and the pressure had been released, the copolymer was filtered off (yield: 150 ml of filtrate), washed with 200 ml of methanol and dried at 70° C. 21 g Copolymer having a palladium content of 37 ppmw was obtained, which means that only 37% of the palladium present in the catalyst had remained behind in the copolymer.

The 150 ml of filtrate obtained from the filtration of the copolymer was then re-introduced into the autoclave. In this case the air present in the autoclave was not expelled. Therefore, the autoclave contained 1 bar of air. After the contents of the autoclave had been brought to 85° C., a 1:1 carbon monoxide/ethylene mixture was introduced under pressure until a pressure of 55 bar was reached. The pressure was maintained at 55 bar by introducing under pressure a 1:1 carbon monoxide/ethylene mixture. It was observed that in the course of one hour the rate of polymerization went up from 0 to 4.5 g/hour. This latter value corresponds with the original activity of the palladium catalyst. After some time the activity gradually disappeared, which was caused by the excess of oxygen present in the autoclave in relation to phosphine (150 ml of air in the autoclave ~30 ml of oxygen ~1 mmol of oxygen; this is a 25-fold excess to the 0.04 mmol of phosphine that was added).

With the acid of $^{13}$C-NMR analysis it was established that the carbon monoxide/ethylene copolymers prepared according to Examples 1 and 2 had a linear alternating structure and consisted of units of the formula —CO($C_2H_4$)—. The copolymers had a melting point of 257° C. Of Examples 1 and 2 only Example 2 is an example according to the invention. Example 1 falls outside the scope of the invention and has been included for comparison. Example 2 clearly demonstrates that a considerable reduction of the palladium content of the polymers can be achieved by applying the process according to the invention, and in addition, that after the process according to the invention has been applied and the treated polymer has been filtered off from the suspension, there remains a filtrate from which an active catalyst solution can in its turn be prepared in a simple way.

What is claimed is:

1. A process for reducing catalyst residues from a palladium compound catalyst-containing polymer of carbon monoxide and ethylene with or without at least one other olefinically unsaturated hydrocarbon having the general formula $CHR_1=CHR_2$, where $R_1$ is a hydrocarbon group and $R_2$ is selected from the group consisting of hydrogen and a hydrocarbon group, and where $R_1$ and $R_2$ together contain fewer than 18 carbon atoms, and regenerating a palladium compound catalyst for the preparation of said polymers, which process comprises contacting the polymer in an organic liquid with an effective amount for reducing catalyst residues of a phosphine having the general formula

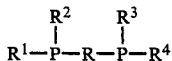

wherein $R^1$, $R^2$, $R^3$ and $R^4$ represent hydrocarbon groups or such groups containing polar or non-polar substituents and R represents a bivalent organic bridging group containing at least two carbon atoms in the bridge, recovering a palladium compound-containing organic liquid, contacting said organic liquid with an oxidant selected from the group consisting of peroxides, hydroperoxides and oxygen, and recycling the thus contacted organic liquid to a process for preparing a polymer of carbon monoxide and ethylene with or without at least one olefinically unsaturated hydrocarbon.

2. The process of claim 1 wherein the organic liquid is a lower alcohol.

3. The process of claim 2 wherein the organic liquid is selected from the group consisting of methanol and ethanol.

4. The process of claim 2 wherein the hydrocarbon groups $R^1$, $R^2$, $R^3$ and $R^4$ of the bidentate phosphine ligand each contain 6 to 14 carbon atoms.

5. The process of claim 4 wherein the hydrocarbon groups $R^1$, $R^2$, $R^3$ and $R^4$ of the bidentate phosphine ligand are selected from the group consisting of phenyl groups, alkyl substituted phenyl groups, and phenyl groups with polar substituents.

6. The process of claim 5 wherein the phosphine is selected from the group consisting of 1,3-bis(diphenylphosphino)propane, 1,3-bis(di-p-tolylphosphino)propane and 2-methyl-2-(methyldiphenylphosphino)-1,3-bis(diphenylphosphino)propane.

7. The process of claim 5 wherein contacting temperature is from about 50° to about 140° C.

8. The process of claim 5 wherein contacting temperature is from about 80° to about 110° C.

9. The process of claim 5 wherein the polymer is a polymer of carbon monoxide and ethylene.

10. The process of claim 9 wherein the olefinically unsaturated hydrocarbon, hydrocarbon has the general formula $CHR_1=CHR_2$, where $R_1$ is an hydrocarbon group and $R_2$ is selected from the group consisting of hydrogen and an hydrocarbon group, and where $R_1$ and $R_2$ together contain fewer than 18 carbon atoms.

11. The process of claim 10 wherein $R_1$ is hydrogen and $R_2$ is an alkyl group.

12. The process of claim 11 wherein the olefinically unsaturated hydrocarbon is propylene.

* * * * *